United States Patent [19]

Nakagawa et al.

[11] Patent Number: 4,535,356

[45] Date of Patent: Aug. 13, 1985

[54] MUSIC INFORMATION TRANSMISSION SYSTEM

[75] Inventors: Koichi Nakagawa; Yoshio Sugimori; Yoshihide Kimata; Yosai Araki; Tomoji Arai, all of Tokyo, Japan

[73] Assignees: Nippon Television Network Corporation; OKI Electric Industry Co., Ltd.; KEIO Electronic Laboratory Corporation, all of Tokyo, Japan

[21] Appl. No.: 451,552

[22] Filed: Dec. 20, 1982

[30] Foreign Application Priority Data

Dec. 28, 1981 [JP] Japan ............................ 56-209647
Dec. 28, 1981 [JP] Japan ............................ 56-209648

[51] Int. Cl.³ .................... H04N 7/04; H04N 7/08
[52] U.S. Cl. .................................. 358/145; 358/142; 358/147; 84/115; 84/DIG. 6
[58] Field of Search ................ 358/141–147; 84/115, 1.01, 470 R, DIG. 6

[56] References Cited

U.S. PATENT DOCUMENTS

| | | | |
|---|---|---|---|
| 4,023,456 | 5/1977 | Groeschel | 84/115 |
| 4,215,343 | 7/1980 | Ejiri et al. | 84/DIG. 6 |
| 4,253,115 | 2/1981 | Kergosien et al. | 358/145 |
| 4,399,731 | 8/1983 | Aoki | 84/470 R |
| 4,416,182 | 11/1983 | Wise et al. | 84/470 R |
| 4,419,920 | 12/1983 | Ohe | 358/143 |

Primary Examiner—Tommy P. Chin
Assistant Examiner—Michael D. Parker
Attorney, Agent, or Firm—Martin M. Novack

[57] ABSTRACT

A music information transmission system in which a music symbol on a music sheet is quantized into a digital signal by inputting that music symbol by using a key board. The digital signal is assembled into a packet, which is multiplexed on a blanking period of a television signal, and is transmitted over the air. At a reception side, the packet is separated from a picture signal, and is stored in a memory. A music player reads out the memory, and decodes the digital signal in the memory. The decoded signal operates the music player to play music. Thus, music information may be transmitted in a very narrow frequency band as compared with a conventional PCM system which quantizes an analog sound signal into a digital signal. The presnt invention is useful for instance for playing background music in a teletext or a character transmission system multiplexed with a television signal.

3 Claims, 7 Drawing Figures

MUSIC INFORMATION TRANSMISSION SYSTEM

BACKGROUND OF THE INVENTION

The present invention relates to a music information transmission system, and, in particular, relates to such a system in which music information is multiplexed with a television signal.

Conventionally, a music signal is transmitted through a wireless system or a cable to a reception side by transmitting an analog signal. In the conventional system, music information which is recorded on a record or a magnetic tape is converted to an electrical signal, which is then modulated to AM (amplitude modulation), or FM (frequency modulation), and a transmission station transmits that FM or AM signal over the air. Then, a reception side receives the signal, and demodulates that AM or FM signal, to reproduce music information which generates the music sound through a speaker.

However, that analog transmission system has the disadvantage that it needs a wide frequency band, thus, the information quantity transmitted in each unit frequency band is rather small, and the S/N (signal to noise ratio at a reception side) is deteriorated by noise in on a transmission path.

A digital transmission system in which an anglog music signal is sampled and quantized solves the problem of deterioration of S/N. However, it still has the disadvantage of wide frequency band.

Further, a prior music information transmission system has the disadvantage that the music information signal can not be multiplexed to a conventional television signal. Therefore, a teletext in which character information is multiplexed to a television signal can not generally play background music with characters on a screen.

SUMMARY OF THE INVENTION

It is an object, therefore, of the present invention to overcome the disadvantages and limitations of prior music information transmission system by providing a new and improved music information transmission systems.

It is also an object of the present invention to provide a music information transmission system, in which music information is transmitted in a digital form which is transmitted in a narrow frequency band.

It is also an object of the present invention to provide a music information transmission system, in which a music signal is multiplexed with a conventional television signal.

The above and other objects are attained by a music information transmission system comprising an input means for quantizing a music symbol on a music sheet into a digital signal; means for assembling said digital signal into a packet which has a header portion and a data portion; means for multiplexing said packet in a blanking period of a television signal; a wireless transmission system for transmitting said television signal; a reception means for receiving said television signal and separating a picture signal and a packet; memory means for storing a music signal in the packet; and means for reading out the content of said memory means and playing the same.

BRIEF DECSRIPTION OF THE DRAWINGS

The foregoing and other objects, features, and attendant advantages of the present invention will be appreciated as the same become better understood by means of the following description and accompanying drawings wherein:

FIG. 1A and 1B show a block diagram of the music information transmission system according to the present invention, FIG. 2 is an example of music sheet which is to be encoded and transmitted by the present system, FIG. 3 is a block diagram of a music converter 100 of FIG. 1, FIG. 4 is the explanatory drawing of a data packet, FIG. 5 is a block diagram of a music player for use in the present invention, and FIG. 6 is a block diagram of another music player for the use in the present invention.

DESCRIPTION OF THE PREFERRED EMBODIMENTS

Figure 1A:
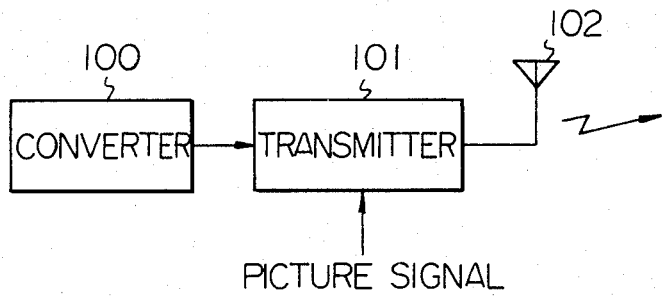
Figure 1B:
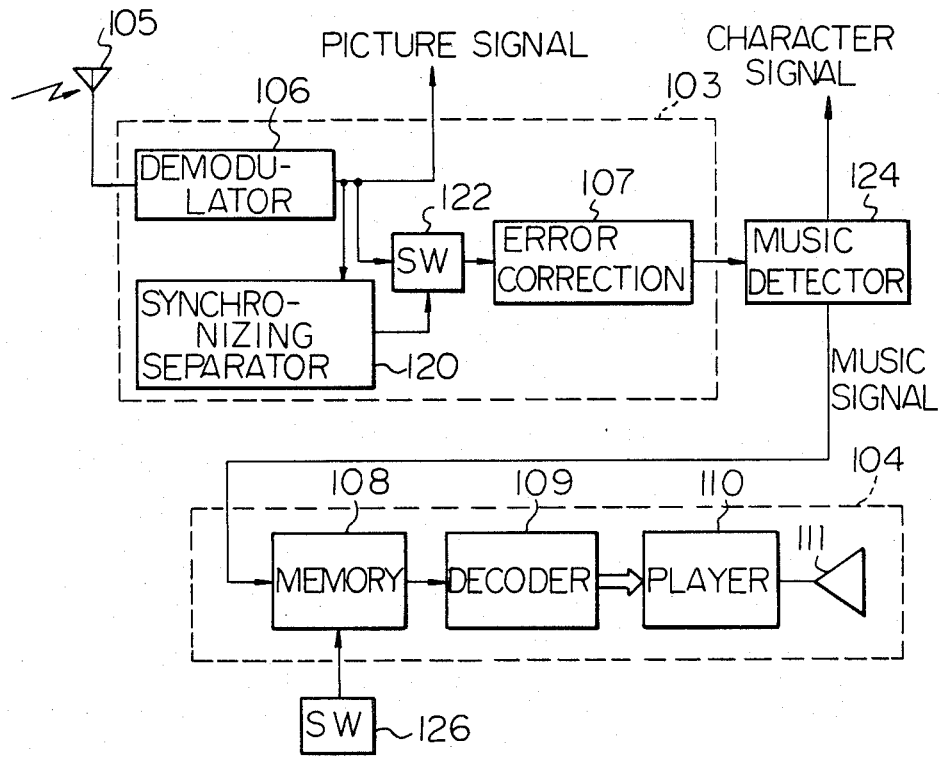
Figure 2:
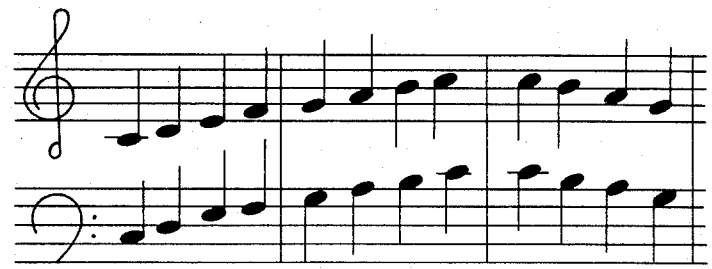

FIG. 1 is a block diagram of a music information transmission system according to the present invention. The transmission side of FIG. 1 comprises a music information converter or coder 100, a transmitter 101, and a transmission antenna 102. The converter 101 encodes music information to a digital form. An example of music information is shown in FIG. 2 in the form of a music sheet, and the music information includes a musical interval or step (letter name), tone color, dynamics etc. for playing music.

Figure 3:
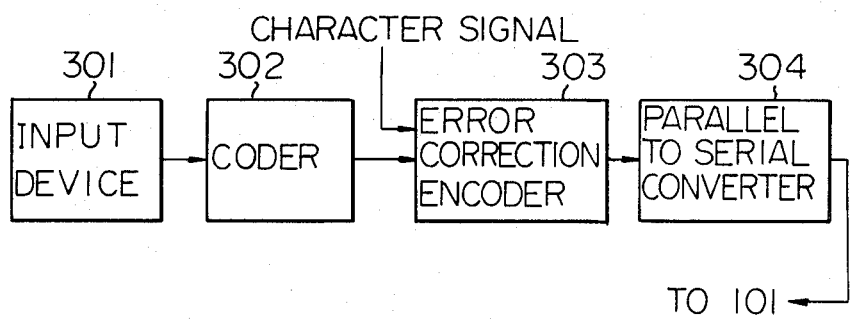

The block diagram of the converter 100 of FIG. 1 is shown in FIG. 3, in which the reference numeral 301 is an input device which is implemented for instance by a key board. 302 is a coder which encodes music information generated by the input device 301, 303 is an error correction code generator for attaching an error correcting code to the output of the coder 302, and 304 is the serial data converter which converts a parallel digital data to a serial data. The output of the serial converter 304 is applied to the transmitter 101. A character signal is also applied to the error correction code generator.

The input device 301 has a key board which has about 100 keys for the input of interval or pitch, duration between each note, tone color, dynamics etc. The 100 number of keys are enough for expressing music information played by a piano.

Figure 4:
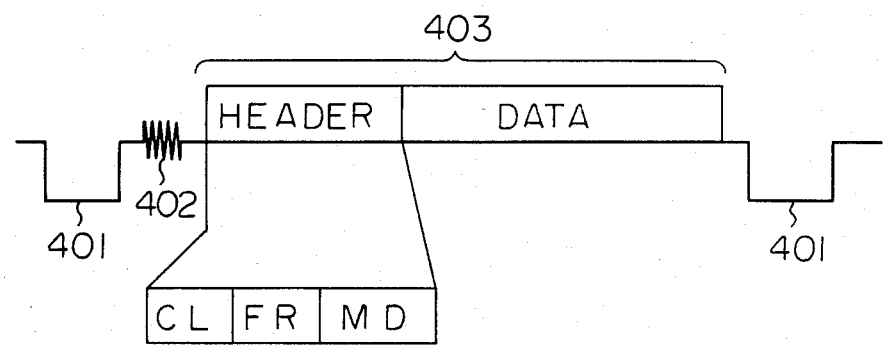

The coder 302 encodes the output information of the input device 301. The input information by depressing one of 100 keys may be encoded into a word with 10 bits. When a music has 10 measures each having 4 quarter notes, those notes are encoded in 400 bits (10×4×10), and therefore, a music may be encoded in a word with less than 200 bytes (1600 bits) including an accompaniment, or dynamics etc. It should be noted that if an analog music signal is encoded into a PCM signal through sampling process, it would need an extravagant quantity of bits. The encoded data is assembled into a packet, which has a header portion and a data portion as shown in FIG. 4. A header portion has a clock signal (CL) for indicating the beginning of a packet, a framing signal (FR) which indicates the sequence of a packet, and a music detector (MD) which indicates that the packet concerns a music but not a character signal. The framing signal (FR) is effective when a music is encoded into a plurality of packets. The packet which is the output of the coder 302 is applied to the error correction code encoder 303 which also receives a character packet, and attaches some error correction bits to each packet for error correction purposes. The error correction system used in the encoder 303 may be conventional. The output of the error correction code encoder 303 is applied to the parallel to serial converter 304 which provides a packet signal in a serial form. The output of the converter 304 is applied to the transmitter 101 of FIG. 1, which also receives a picture signal, and the transmitter 101 inserts a packet in a blanking period of a picture signal. Thus, a whole television signal having not only a picture signal but also a music signal is obtained, and that television signal is transmitted through an antenna 102.

FIG. 4 shows a signal format of a music signal, in which the reference numeral 401 is a horizontal synchronizing signal, 402 is a color sub-carrier signal, and 403 is a music packet inserted in a vertical blanking period. The data portion in a music packet 403 has music information including an interval or pitch of each note, a tone color, and/or dynamics for playing a music.

The packet 403 has a header portion and a data portion. The header portion has the clock area (CL) for indicating the beginning of the packet, the framing area (FR), and the music detecter (MD). The framing area shows the sequence of the packet, and is useful when a music is encoded in a plurality of packets. The music detector (MD) shows whether the packet concerns music or character information.

When a packet is multiplexed in a vertical blanking period of a conventional television signal, the packet may contain about 300 bits including 248 bits of data portion. Therefore, when a music has 1600 bits, that music information is transmitted in 6 blanking periods.

A television signal may also multiplex a character signal in a similar packet form in a vertical blanking period, and a music packet and a character packet are transmitted alternately. The music packet is separated in a reception side, and is used to play a background music when a related character packet is indicated on a screen.

A reception side has a reception antenna 105, a conventional television receiver 103, a music detector 124, and a player 104. The television receiver 103 is conventional, and has a demodulator 106 which demodulates an FM television signal to provide a picture signal which appears on a screen. A synchronizing separator 120 derives a vertical synchronizing signal in a picture signal as a gate control signal which is applied to a gate switch 122. Then, the gate switch 122 derives a packet data inserted in a blanking period using said gate control signal. The packet 403 thus obtained is applied to the error correction circuit 107, which corrects a transmission error if there is an error.

Then, the packet 403 is applied to the music detector 124, which tests if the music detector MD in the header portion of the packet designates a character signal or a music signal. If the MD designates a character signal, the data portion of the packet is output as a character signal, which is indicated on a screen in a conventional manner. If the MD designates a music signal, the data portion of the packet is applied to the memory 108 and is stored in the same. It should be noted that the operation of writing data into the memory 108 is intermittent, since a packet is transmitted in a blanking period of a television signal.

When a full music is stored in the memory 108, the content of the memory 108 is read out continuously, and each data is applied to the decoder 109, which decodes the quantized digital data to a music symbol of FIG. 2. The decoded music symbols are applied to the player 110, which energizes a speaker 111.

A manual switch 126 is coupled with the memory 108, and said switch 126 releases the memory 108 when the music in the memory 108 has been played, then, a new music is stored in the memory 108.

Figure 5:
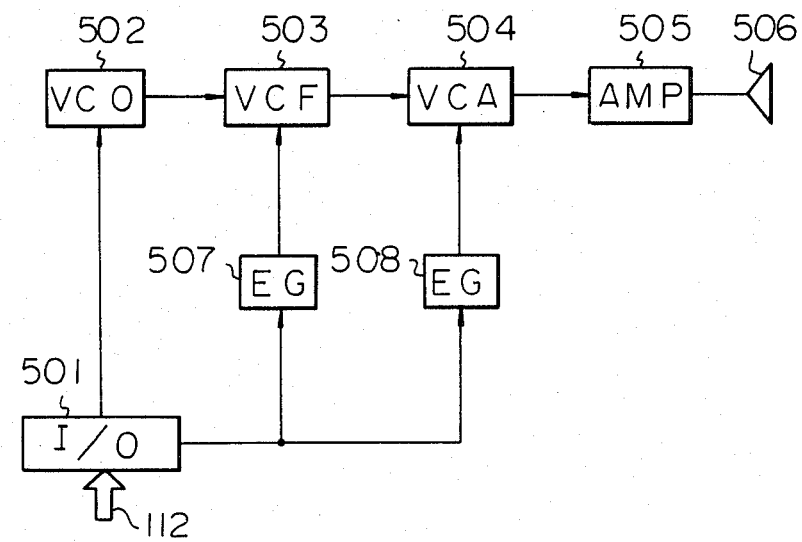
Figure 6:
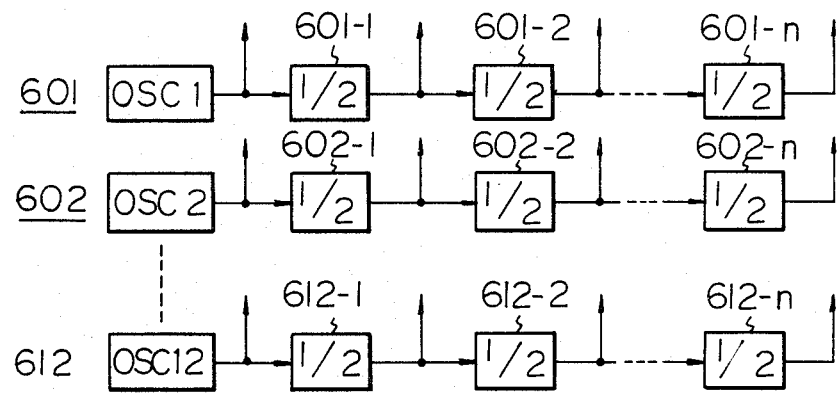

The player 110 may be a conventional electronic organ, a conventional electronic piano, or a conventional electronic music synthesizer, and FIGS. 5 and 6 show the two embodiments of a player.

In FIG. 5, a player has a voltage controlled oscillator (VCO) 502, a voltage controlled filter (VCF) 503, a voltage controlled amplifier (VCA) 504 for generating three elements (interval, tone color, and dynamics) of each sound of music. The reference numeral 501 is a control I/O 501 which is coupled with the output of the decoder 109 of FIG. 1, and receives the decoded output 112, the reference numerals 507 and 508 are envelope generators, which designates an envelope by an attack time, a decay time, a sustain level, and a release time (ADSR) to generate an envelope of a control voltage.

The voltage controlled oscillator (VCO) 502 generates a waveform of sawtooth wave, rectangular wave, or triangular wave, and the frequency of the same is defined by the control signal 112. The output of the oscillator 502 has the information of an interval or pitch of sound, and is applied to the voltage controlled filter (VCF) 503 and the voltage controlled amplifier (VCA) 504 for modifying the tone color.

The voltage controlled filter (VCF) 503 is a variable filter, the cutoff frequency of which is defined by the control signal 112, to adjust a tone color of sound by controlling quantity of harmonic overtone. The tone color of the voltage controlled filter 503 is controlled by the envelope generator 507, and therefore, that tone color changes with time, thus, any tone color for each musical instrument is obtained.

The voltage controlled amplifier (VCA) 504 provides the dynamics which is defined by the envelope generator 508, to provide the desired dynamics particular to each musical instrument. The synthesized music is amplified by the amplifier 505, which energizes a speaker 506.

When a plurality of musical tones are desired, a plurality of groups of voltage controlled oscillator, a voltage controlled filter, a voltage controlled amplifier, and an envelope generator are installed.

FIG. 6 is another embodiment of a player. In the figure, the reference numerals 601 through 612 are 12 number of oscillators for generating basic intervals or pitches in an octave. The numerals 601-1 through 601-n are a frequency divider for halving the frequency for providing the necessary n-octaves intervals. Each interval or pitch generated in the device of FIG. 6 corresponds to the output of the oscillater 502 of FIG. 5, and is processed to attach the desired tone color and the dynamics.

It should be noted that the output of the control I/O 501 is the same as the output of a keyboard of a conventional electronic organ or piano, and therefore, a player may be substituted by a conventional electronic organ, piano or synthesizer. Some examples of a commercially purchased synthesizer for the use of the present player are "Poly-61 type polyphonic synthesizer" manufactured by Keio Electronic Laboratory Corportion in Tokyo, Japan, and "PC-100 type Portasound" manufactured by Nippon Gakki Co. Ltd, in Tokyo, Japan.

As described above in detail, according to the present invention, music information is quantized in a digital form, and therefore, the information quantity of each sound is very small as compared with that of a conventional PCM system, which quantizes an analog signal. And, since a signal is transmitted in a digital form, the system does not suffer from noise in a transmission path, and a high quality of music is obtained. Further, since the information quantity of music is small, the present data may be transmitted in a blanking period of a television signal.

Some of the application fields of the present invention are the transmission of background music in a character broadcasting system multiplexed on a television signal (teletext), a remote playing of an electronic music instrument, and information storage of music with small capacity of memory.

From the foregoing, it will now be apparent that a new and improved music information transmission system has been discovered. It should be understood of course that the embodiments disclosed are merely illustrative and are not intended to limit the scope of the invention. Reference should be made to the appended claims, therefore, rather than the specification as indicating the scope of the invention.

What is claimed is:

1. A music information transmission system comprising:
    input means having a keyboard for quantizing and modulating a music symbol representable on a music sheet into a digital signal by providing said symbol through said keyboard,
    means for assembling said digital signal and a character signal into a packet which has a header portion and a data portion, said header portion having at least a music detector area for indicating that the data portion relates to music,
    means for multiplexing said packet in a blanking period of a television signal,
    means for transmitting said television signal,
    reception means for receiving said television signal and separating said packet from a picture signal which is to be displayed on a screen,
    means for separating from said packet said digital signal relating to said music symbol and said character signal,
    memory means for storing temporarily said separated digital signal,
    decoding means for reading out the content of said memory means and decoding the digitally encoded music symbol,
    means for displaying characters in said packet on a screen, and
    means for playing audio represented by the music symbols decoded by said decoding means.

2. A music information transmission system according to claim 1, wherein an error encoding means is provided for attaching an error correction code to said packet so that a transmission error may be automatically corrected at a reception site.

3. A music information receiver system for receiving a packet having a digitally encoded music symbol and a character signal which are multiplexed on a blanking period of a television signal, comprising a receiver circuit for demodulating said television signal and separating said packet multiplexed on said blanking period of said television signal from a picture signal, a music detector for separating said digitally encoded music symbol and a character signal in said packet, memory means for storing temporarily said digitally encoded music symbol, decoding means for reading out the content of said memory means and decoding the digitally encoded music symbol, and means for playing audio represented by the music symbols decoded by said decoding means.

* * * * *